United States Patent [19]
Ren

[11] Patent Number: 6,022,613
[45] Date of Patent: Feb. 8, 2000

[54] TRANSPARENT POLYAMIDE COMPOSITIONS

[75] Inventor: Jie Ren, Morris Plains, N.J.

[73] Assignee: AlliedSignal Inc., Morris Township, N.J.

[21] Appl. No.: 09/330,273

[22] Filed: Jun. 11, 1999

[51] Int. Cl.⁷ .............................. C08L 77/00; B32B 7/02
[52] U.S. Cl. .................... 428/220; 428/339; 428/357; 428/364; 524/538; 525/432
[58] Field of Search ............................ 525/432; 428/220, 428/339, 357, 364; 524/538

[56] References Cited

U.S. PATENT DOCUMENTS

| | | | |
|---|---|---|---|
| 4,404,317 | 9/1983 | Epstein et al. | 524/538 |
| 4,556,696 | 12/1985 | Stewart et al. | 525/432 |
| 4,873,276 | 10/1989 | Fujii et al. | 524/153 |
| 4,945,129 | 7/1990 | Mason et al. | 525/66 |
| 5,162,440 | 11/1992 | Akkapeddi et al. | 525/149 |
| 5,359,013 | 10/1994 | Mason et al. | 525/432 |
| 5,480,945 | 1/1996 | Vicik | 525/432 |
| 5,508,345 | 4/1996 | Hirata et al. | 525/66 |
| 5,886,087 | 3/1999 | Dalla Torre | 524/538 |

FOREIGN PATENT DOCUMENTS 0382277  8/1990  European Pat. Off.

*Primary Examiner*—Ana Woodward
*Attorney, Agent, or Firm*—Roger H. Criss

[57] ABSTRACT

This invention provides polyamide compositions and films made therefrom, having enhanced physical properties and a high degree of transparency. More particularly, the invention pertains to polyamide compositions having increased transparency while maintaining a high degree of crystallinity. The polyamide compositions contain a first polyamide homopolymer or copolymer having balanced amino and acid terminal group; and a second polyamide homopolymer or copolymer having an excess of terminal amino groups, wherein the first polyamide is present in an amount of from about 10 to about 95 percent by weight and the second polyamide is present in an amount from about 5 to about 90 percent by weight, based on the total weight of the first and second polyamides.

30 Claims, No Drawings

TRANSPARENT POLYAMIDE COMPOSITIONS

BACKGROUND OF THE INVENTION

1. Field of the Invention

This invention pertains to polyamide compositions and films made therefrom, having a high degree of transparency while maintaining their physical properties. More particularly, the invention pertains to polyamide compositions having high transparency while maintaining a high degree of crystallinity, good mechanical strength, high heat distortion temperature, and high flexibility.

2. Description of the Prior Art

It is known in the art to use polyamides or nylons for their unique properties, such as mechanical strength and thermoformability. In order to enhance the performance of most nylons, it is desirable to have a high degree of crystallinity. However, a high degree of crystallinity reduces the transparency of the nylon. Suppressing the degree of crystallinity in nylon is known to keep films made from nylon transparent. This has been accomplished by blending a polyamide with an amorphous, aromatic nylon. However, the resultant film has reduced physical strength due to the lower degree of crystallinity.

U.S. Pat. No. 4,404,317 teaches the blending of amorphous polyamide copolymers with semicrystalline polyamides to produce molding resins having enhanced properties. The various enhanced properties are dependent on the relative amounts of amorphous and crystallizable polyamides. U.S. Pat. No. 5,480,945 teaches single and multilayer nylon films utilizing blends comprising an amorphous nylon and a nylon copolyamide and having improved processability, shrinkage and optical properties. U.S. Pat. No. 4,556,696 teaches a process to form a polyamide film utilizing a blend of polyamides such as polyamides with terminal functionality including carboxylic acid group termination and amino group termination. U.S. Pat. No. 5,886,087 teaches transparent, colorless and amorphous polyamides, and their blends. These references teach the blending of polyamides for the purpose of changing properties of a nylon composition, but they do not teach the characteristics of the present invention which include good transparency and maintained high crystallinity. The present invention solves the problems in the prior art by providing a polyamide composition with improved crystallization rate while maintaining a high level of crystallinity and a high degree of transparency.

SUMMARY OF THE INVENTION

The invention provides a polyamide composition comprising:

a) a first polyamide homopolymer or copolymer having balanced amino and acid terminal groups; and b) a second polyamide homopolymer or copolymer having an excess of terminal amino groups, wherein the first polyamide is present in an amount of from about 10 to about 95 percent by weight and the second polyamide is present in an amount from about 5 to about 90 percent by weight, based on the total weight of the first and second polyamides.

The invention also provides a substantially transparent polyamide film which comprises:

a) a first polyamide homopolymer or copolymer having balanced amino and acid terminal groups; and b) a second polyamide homopolymer or copolymer having an excess of terminal amino groups, wherein the first polyamide is present in an amount of from about 10 to about 95 percent by weight and the second polyamide is present in an amount from about 5 to about 90 percent by weight, based on the total weight of the first and second polyamides.

The invention further provides a method for modifying the crystallization rate of a first polyamide homopolymer or copolymer having balanced amino and acid terminal groups which comprises blending a second polyamide homopolymer or copolymer has an excess of terminal amino groups with the first polyamide, wherein the first polyamide is present in an amount of from about 10 to about 95 percent by weight and the second polyamide is present in an amount from about 5 to about 90 percent by weight, based on the total weight of the first and second polyamides.

It has now been unexpectedly found that when a polyamide homopolymer or copolymer having balanced terminal amino and acid groups is blended with a polyamide homopolymer or copolymer having an excess of amino terminal groups, wherein the first polyamide is present in an amount of from about 10 to about 95 percent by weight and the second polyamide is present in an amount from about 5 to about 90 percent by weight, based on the total weight of the first and second polyamides, that a composition with a high degree of transparency and high crystallinity is formed.

DETAILED DESCRIPTION OF THE PREFERRED EMBODIMENTS

In the present invention, an improved polyamide composition is prepared by blending a first polyamide homopolymer or copolymer with a second polyamide homopolymer or copolymer. The first polyamide homopolymer or copolymer of the composition has balanced amino and acid terminal groups and preferably one amino terminal group and one acid terminal group. The second polyamide homopolymer or copolymer of the composition has an excess of amine terminal groups. For purposes of this invention, has an excess of amine terminal groups means the amount of amine terminal groups is greater than the amount of acid terminal groups.

Polyamides such as nylon-6 or nylon 6,6 can contain a variety of terminal functionality, including: (a) a carboxyl group attached to both ends of the polyamide chain; (b) a carboxyl group attached to one end and an amide group attached to the other end of the polyamide chain (the "capped" end) (only polylactams); (c) an amino group attached to both ends of the polyamide chain; (d) a carboxyl group attached to one end and an amine group attached to the other end of the polyamide chain (only polylactams); and mixtures thereof. For the purposes of the present invention, amine terminated polyamide is considered to be a polyamide comprising molecules having amino end groups as at least two end groups of the polyamide molecule. Polyamides having "excess" amine termination are polyamides having molecules with more than 50 mole percent and preferably at least about 60 mole percent and more preferably about 60 to about 97 mole percent of its end groups as amino end groups. Amine end group termination is typically produced by including an excess of diamines during polymerization.

General procedures useful for the preparation of polyamides are well known to the art, and the details of their formation are described under the heading "Polyamides" in the Encyclopedia of Polymer Science and Technology, published by John Wiley & Sons, Inc, Vol. 10, pps.487–491, (1969). Useful diacids for making polyamides include dicarboxylic acids which are represented by the general formula

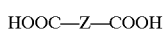

wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4-trimethylpentamethylenediamine, as well as cycloaliphatic diamines, such as diaminodicyclohexylmethane, and other compounds. Other useful diamines include heptamethylenediamine, nonamethylenediamine, and the like.

Each of the first and second polyamides may comprise any of the following aliphatic, aromatic or aliphatic/aromatic nylon homopolymer or copolymers provided the first polyamide homopolymer or copolymer of the composition has one amino terminating group and one acid terminating group and the second polyamide homopolymer or copolymer of the composition has two terminating amino groups. In one preferred embodiment of the invention, the first polyamide is present in an amount of from about 10 to about 95 percent by weight and the second polyamide is present in an amount from about 5 to about 90 percent by weight, based on the total weight of the first and second polyamides. In a more preferred embodiment, the first polyamide is present in an amount of from about 50 to about 80 percent by weight and the second polyamide is present in an amount from about 20 to about 50 percent by weight, based on the total weight of the first and second polyamides. In a more preferred embodiment, the first polyamide is present in an amount of from about 60 to about 80 percent by weight and the second polyamide is present in an amount from about 20 to about 40 percent by weight, based on the total weight of the first and second polyamides.

Such useful polyamides may be poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), and the like. Also, illustrative of useful aliphatic polyamides are those formed by polymerization of amino acids and derivatives thereof, as for example lactams. Such useful polyamide homopolymers include poly(4-aminobutyric acid) (nylon 4), poly(6-aminohexanoic acid) (nylon 6, also known as poly (caprolactam)), poly(7-aminoheptanoic acid) (nylon 7), poly (8-aminooctanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), as well as nylon 46, nylon 66 and nylon 69 and the like.

Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-oxalic acid) (nylon 4,2), poly(tetramethylenediamine-co-isophthalic acid) (nylon 4,I), polyhexamethylene isophthalamide (nylon 6,I), the polyamide of n-dodecanedioic acid and hexamethylenediamine (nylon 6,12), the polyamide of dodecamethylenediamine and n-dodecanedioic acid (nylon 12,12), as well as copolymers thereof which include: hexamethylene adipamide/hexamethylene-isophthalamide (nylon 6,6/6I), hexamethylene adipamide/hexamethyleneterephthalamide (nylon 6,6/6T) and as well as others which are not particularly delineated here.

Of these polyamides, preferred polyamides include polycaprolactam, which is also commonly referred to as nylon 6, and polyhexamethylene adipamide, which is also commonly referred to as nylon 6,6, as well as mixtures of the same. Of these, polycaprolactam is most preferred.

Aliphatic polyamides used in the practice of this invention may be obtained from commercial sources or prepared in accordance with known preparatory techniques. For example, poly(caprolactam) can be obtained from Allied-Signal Inc., Morristown, N.J. under the trademark CAPRON®. Suitable variants of CAPRON® for use as a first polyamide in the present invention include CAPRON® 8200 nylon, a balanced nylon 6 having a formic acid viscosity (FAV) of 75, CAPRON® 1767 nylon, a balanced nylon 6 having an FAV of 35, and CAPRON® 8224HSL nylon, a heat stabilized, lubricated nylon 6 having an FAV of 60. A suitable variant of CAPRON® nylon for use as a second polyamide includes CAPRON® 1250 nylon, an amine-terminated nylon 6 with a FAV of 60 and having terminal amino groups of 70 to 78 milliequivalents per gram.

Exemplary of aliphatic/aromatic polyamides include poly (2,2,2-trimethyl hexamethylene terephthalamide), poly(m-xylylene adipamide) (MXD6), poly(p-xylylene adipamide), poly(hexamethylene terephthalamide), poly (dodecamethylene terephthalamide), and the like. Blends of two or more aliphatic/aromatic polyamides can also be used. The most preferred aliphatic/aromatic polyamide is poly(m-xylylene adipamide). Aliphatic/aromatic polyamides can be prepared by known preparative techniques or can be obtained from commercial sources.

The amount of diamine needed to produce the excess amino terminated polyamides of the present invention varies depending on the amount of amine desired and the molecule weight of the resulting polymer and can be easily determined by one skilled in the art. For example, about 0.25 mole percent of hexamethylene diamine may be used to produce a polyepsiloncaprolactam of about 21,000 number average molecular weight having about 80 equivalents/$10^6$ g amino end groups and about 17 equivalents/$10^6$ g acid end groups. In the present invention, what is important is that the amount of terminal amine group is greater than the amount of terminal carboxylic group in the polyamide. Such polyamides may be obtained by adding an excessive amount of, for instance, compounds having a group reactive with a carboxylic group, such a diamines, to a polymerization system of the polyamide. Alternatively, such polyamides may be obtained by reacting the polyamide with, for instance, compounds having a group reactive with a carboxylic group after polymerization of the polyamide.

Polyamides of the nylon 6 type suitable for the preparation of the compositions of the present invention may be obtained by polymerizing a monoaminomonocarboxylic acid or a lactam thereof having at least 2 carbon atoms between the amino and carboxylic acid group; or by polymerizing a diamine which contains at least 2 carbon atoms between the amino groups and a dicarboxylic acid; or by polymerizing a monoaminocarboxylic acid or a lactam thereof as defined above together with a diamine and a dicarboxylic acid. The dicarboxylic acid may be used in the form of a functional derivative thereof, for example an ester or acid chloride.

Polyamides of the nylon 6,6 type having a balanced amino and acid terminal group can be produced through condensation of equimolar amounts of a diamine with a diacid resulting in a balance of the two terminal groups. Polyamides having an excess terminal amino groups can be prepared through the condensation of a diacid with an excess of a diamine to allow for greater amount of amino terminal groups than acid groups.

The composition of the invention may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators, plasticizers, as well as other conventional additives known to the art. These conventional additives may be incorporated into compositions at any suitable stage of the production process, and typically are introduced in the mixing step and included in an extrudate.

By way of example, representative ultraviolet light stabilizers include various substituted resorcinols, salicylates, benzotriazole, benzophenones, and the like. Suitable exemplary lubricants and mold release agents include stearic acid, stearyl alcohol, stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

Suitable fillers include inorganic fillers, including those of fibrous and granular nature, as wells as mixtures thereof. The fibrous fillers include glass, silica glass, ceramic, asbestos, alumina, silicon carbide, gypsum, metal (including stainless steel) as well as other inorganic and carbon fibers. The granular fillers include wollastonite, sericite, asbestos, talc, mica, clay, kaolin, bentonite, and silicates, including alumina silicate. Other granular fillers include metal oxides, such as alumina, silica, magnesium oxide, zirconium oxide, titanium oxide. Further granular fillers include carbonates such as calcium carbonate, magnesium carbonate, and dolomite, sulfates including calcium sulfate and barium sulfate, boron nitride, glass beads, silicon carbide, as well as other materials not specifically denoted here. These fillers may be hollow, for example glass microspheres, silane balloon, carbon balloon, and hollow glass fiber. Preferred inorganic fillers include glass fibers, carbon fibers, metal fibers, potassium titanate whisker, glass beads, glass flakes, wollastonite, mica, talc, clay, titanium oxide, aluminum oxide, calcium carbonate and barium sulfate. Particularly, glass fiber is most preferred. The inorganic fillers should preferably be treated with silane, titanate, or another conventional coupling agent, and glass fibers should preferably be treated with an epoxy resin, vinyl acetate resin or other conventional converging agent.

The composition may be formed by dry blending solid particles or pellets of each of the polyamide components and then melt blending the mixture in a suitable mixing means such as an extruder, a roll mixer or the like. Typical melting temperatures range from about 175° C. to about 260° C., preferably from about 215° C. to about 225° C., and more preferably from about 220° C. to about 223° C. for nylon 6. Blending is conducted for a period of time required to attain a substantially uniform blend. Such may easily be determined by those skilled in the art. If desired, the composition may be cooled and cut into pellets for further processing, it may be extruded into a fiber, a filament, or a shaped element or it may be formed into films and optionally uniaxially or biaxially stretched by means well known in the art.

The films of this invention may be produced by conventional methods useful in producing films, including extrusion and blown film techniques. In the most preferred method, the film is formed by extrusion. Suitable extrusion techniques are well known in the art. For example, the polyamides may be preblended and then the blend fed into an infeed hopper of an extruder, or each polyamide may be fed into infeed hoppers of an extruder and then blended in the extruder. The melted and plasticated stream from the extruder is fed into a single manifold die and extruded into a layer. It then emerges from the die as a single layer film of nylon material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Once cooled and hardened, the result film is preferably substantially transparent.

Alternatively the composition may be formed into a film using a conventional blown film apparatus. The film forming apparatus may be one which is referred to in the art as a "blown film" apparatus and includes a circular die head for bubble blown film through which the plasticized film composition is forced and formed into a film "bubble". The "bubble" is ultimately collapsed and formed into a film.

The composition may also be used to form a shaped article through any well known process, including blow molding and injection molding. An injection molding process softens the thermoplastic nylon blend in a heated cylinder, injecting it while molten under high pressure into a closed mold, cooling the mold to induce solidification, and ejecting the molded article from the mold. Molding compositions are well suited for the production of sheets and panels having desired properties. Sheets and panels are suitable as building materials as substitutes for wood, glass, ceramic, metal or other plastic parts.

The number average molecular weight of each polyamide homopolymer or copolymer may vary widely. Such are sufficiently high to form a free standing film but sufficiently low to allow melt processing of the blend. Such number average molecular weights are well known to those of skill in the film forming art and are usually at least about 5,000 as determined by Gel Permeation Chromatography or the formic acid viscosity (FAV) method (ASTM D-789). In this method, a solution of 11 grams of aliphatic polyamide in 100 ml of 90% formic acid at 25° C. is used. In the preferred embodiments of the invention, the number average molecular weight of each polyamide ranges from about 5,000 to about 100,000, and in the preferred embodiment it ranges from about 15,000 to about 30,000. Most preferred are those in which the number average molecular weight of each polyamide ranges from about 20,000 to about 40,000.

Nylon films produced according to the present invention may be oriented by stretching or drawing the films at draw ratios of from about 1.1:1 to about 10:1, and preferably at a draw ratio of from about 2:1 to about 5:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

The film may be stretched or oriented in any desired direction using methods well known to those skilled in the art. The film may be stretched uniaxially in either the longitudinal direction coincident with the direction of movement of the film being withdrawn from the film forming apparatus, also referred to in the art as the "machine direction", or in as direction which is perpendicular to the machine direction, and referred to in the art as the "transverse direction", or biaxially in both the longitudinal direction and the transverse direction.

The thickness of the polyamide film is preferably from about 0.05 mils (1.3 $\mu$m) to about 100 mils (2540 $\mu$m), and more preferably from about 0.05 mils (1.3 $\mu$m) to about 50 mils (1270 $\mu$m). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.).

The following non-limiting examples serve to illustrate the invention.

EXAMPLE 1

266.8 g (0.5 lbs) of CAPRON® 1250 nylon (commercially available from AlliedSignal Inc. of Morristown, N.J.) dried pellets was physically blended with 2041 g (4.5 lbs) of CAPRON® 8224HSL nylon dried pellets (AlliedSignal). The resultant blend was extruded through a Killion single screw extruder (D=3.8 cm (1.5 in); L/D=24/1) equipped with three heating zones (232° C.>257° C.>260° C.) and two adapters (260° C.). After passing through an extrusion film die maintained at 260° C., the extrudate was cast on a roll maintained at 120° C. The film thickness was controlled at 0.03 cm (12 mil). The resultant film was transparent, and exhibited a crystallization temperature of 182° C. (Differential Scanning Calorimetry—DSC). The yield strength of the film was 815.59 kg/cm$^2$ (11.6 kpsi) and break stress was 485.14 kg/cm$^2$ (6.9 kpsi) (ASTM D638).

EXAMPLE 2

1820 g (4 lbs) of CAPRON® 1250 nylon (AlliedSignal) dried pellets and 4.5 g of ethylene-bis-stearamide (Witco Corporation, Greenwich, Conn.) were physically blended with 253.6 g (1 lb) of CAPRON® 8224HSL nylon dried pellets (AlliedSignal). The resultant blend was extruded and cast into a film as in Example 1. The film thickness was controlled at 0.03 cm (12 mil). The resultant film was transparent, and exhibited a crystallization temperature of 182° C. (DSC). The yield strength of the film was 822.63 kg/cm$^2$ (11.7 kpsi) and break stress was 485.14 kg/cm$^2$ (6.9 kpsi) (ASTM D638).

EXAMPLE 3

680 g (1.5 lbs) of CAPRON® 1250 nylon dried pellets (AlliedSignal) and 4.5 g of ethylene-bis-stearamide (Witco Corporation) were physically blended with 1587 g (3.5 lbs) of CAPRON® 8224HSL nylon dried pellets (AlliedSignal). The resultant blend was extruded and cast into a film as in Example 1. The film thickness was controlled at 0.03 cm (12 mil). The resultant film was transparent, and exhibited a crystallization temperature of 182° C. (DSC). The yield strength of the film was 710.13 kg/cm$^2$ (10.1 kpsi) and break stress was 569.51 kg/cm$^2$ (8.1 kpsi) (ASTM D638).

COMPARATIVE EXAMPLE 1

2263 g (5 lbs) of CAPRON® 8224HSL nylon (AlliedSignal) dried pellets was extruded and cast into a film as in Example 1. The film thickness was controlled at 0.03 cm (12 mil). The resultant film was opaque, and exhibited a crystallization temperature of 190° C. (DSC). The yield strength of the film was 731.22 kg/cm$^2$ (10.4 kpsi) and break stress was 478.11 kg/cm$^2$ (6.8 kpsi) (ASTM D638).

COMPARATIVE EXAMPLE 2

453.6 g (1.0 lb) of CAPRON® 1767 nylon (AlliedSignal) dried pellets was physically blended with 1814 g (4.0 lbs) of CAPRON® 8224HSL nylon dried pellets (AlliedSignal). The resultant blend was extruded and cast into a film as in Example 1. The film thickness was controlled at 0.03 cm (12 mil). The resultant film was opaque.

COMPARATIVE EXAMPLE 3

253.6 g (1.0 lb) of CAPRON® 8200 nylon (AlliedSignal) dried pellets was physically blended with 1814 g (4.0 lbs) of CAPRON® 8224HSL nylon dried pellets (AlliedSignal). The resultant blend was extruded and cast into a film as in Example 1. The film thickness was controlled at 0.03 cm (12 mil). The resultant film was opaque.

It can be seen that by utilizing a mixture of a first polyamide having balanced amino and acid terminal groups and a second polyamide having an excess of terminal amino groups, that a transparent film can be obtained.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A polyamide composition consisting essentially of:
   a) a first polyamide homopolymer or copolymer having balanced amino and acid terminal groups; and
   b) a second polyamide homopolymer or copolymer having an excess of terminal amino groups,
   wherein the first polyamide is present in an amount of from about 10 to about 95 percent by weight and the second polyamide is present in an amount from about 5 to about 90 percent by weight, based on the total weight of the first and second polyamides.

2. The polyamide composition of claim 1 wherein the first polyamide homopolymer or copolymer has an amino terminal group and an acid terminal group.

3. The polyamide composition of claim 1 wherein the second polyamide homopolymer or copolymer has two amino terminal groups.

4. The polyamide composition of claim 1 wherein the first polyamide is present in an amount of from about 50 to about 80 percent by weight and the second polyamide is present in an amount from about 20 to about 50 percent by weight, based on the total weight of the first and second polyamides.

5. The polyamide composition of claim 1 wherein the first polyamide is present in an amount of from about 60 to about 80 percent by weight and the second polyamide is present in an amount from about 20 to about 40 percent by weight, based on the total weight of the first and second polyamides.

6. The polyamide composition of claim 1 wherein the first polyamide is a nylon 6 homopolymer having an amino terminal group and an acid terminal group.

7. The polyamide composition of claim 1 wherein the second polyamide is a nylon 6 homopolymer having two terminal amino groups.

8. The composition of claim 1 further consisting essentially of one or more components selected from the group consisting of oxidative stabilizers, thermal stabilizers, lubricants, mold release agents, flame-retarding agents, oxidation inhibitors, dyes, pigments, coloring agents, ultraviolet light stabilizers, organic fillers, inorganic fillers, reinforcing agents, nucleators and plasticizers.

9. A polyamide consisting essentially of the composition of claim 1 which is in the form of a film, a fiber, a filament or a shaped element.

10. The article of claim 9 wherein the article is substantially transparent.

11. The article of claim 9 further consisting essentially of one or more components selected from the group consisting of oxidative stabilizers, thermal stabilizers, lubricants, mold release agents, flame-retarding agents, oxidation inhibitors, dyes, pigments, coloring agents, ultraviolet light stabilizers, organic fillers, inorganic fillers, reinforcing agents, nucleators and plasticizers.

12. A substantially transparent polyamide film which consists essentially of:
    a) a first polyamide homopolymer or copolymer having balanced amino and acid terminal groups; and
    b) a second polyamide homopolymer or copolymer having an excess of terminal amino groups,
wherein the first polyamide is present in an amount of from about 10 to about 95 percent by weight and the second polyamide is present in an amount from about 5 to about 90 percent by weight, based on the total weight of the first and second polyamides.

13. The polyamide film of claim 12 wherein the first polyamide homopolymer or copolymer has an amino terminal group and an acid terminal group.

14. The polyamide film of claim 12 wherein the second polyamide homopolymer or copolymer has two amino terminal groups.

15. The polyamide film of claim 12 wherein the first polyamide is present in an amount of from about 50 to about 80 percent by weight and the second polyamide is present in an amount from about 20 to about 50 percent by weight, based on the total weight of the first and second polyamides.

16. The polyamide film of claim 12 wherein the first polyamide is present in an amount of from about 60 to about 80 percent by weight and the second polyamide is present in an amount from about 20 to about 40 percent by weight, based on the total weight of the first and second polyamides.

17. The polyamide film of claim 12 wherein the first polyamide is a nylon 6 homopolymer having an amino terminal group and an acid terminal group.

18. The polyamide film of claim 12 wherein the second polyamide is a nylon 6 homopolymer having two terminal amino groups.

19. The polyamide film of claim 12 wherein the film is unoriented.

20. The film of claim 12 wherein the film is uniaxially oriented or biaxially oriented.

21. The film of claim 12 wherein the film is uniaxially or biaxially oriented from about 1.1 to about 10 times in the longitudinal direction, the transverse direction or in each of the longitudinal and transverse directions.

22. The film of claim 12 further consisting essentially of one or more components selected from the group consisting of oxidative stabilizers, thermal stabilizers, lubricants, mold release agents, flame-retarding agents, oxidation inhibitors, dyes, pigments, coloring agents, ultraviolet light stabilizers, organic fillers, inorganic fillers, reinforcing agents, nucleators and plasticizers.

23. A method for modifying the crystallization rate of a first polyamide homopolymer or copolymer having balanced amino and acid terminal groups which consists essentially of blending a second polyamide homopolymer or copolymer having an excess of terminal amino groups with the first polyamide, wherein the first polyamide is present in an amount of from about 10 to about 95 percent by weight and the second polyamide is present in an amount from about 5 to about 90 percent by weight, based on the total weight of the first and second polyamides.

24. The method of claim 23 wherein the first polyamide homopolymer or copolymer has an amino terminal group and an acid terminal group.

25. The method of claim 23 wherein the second polyamide homopolymer or copolymer has two amino terminal groups.

26. The method of claim 23 wherein the first polyamide is present in an amount of from about 50 to about 80 percent by weight and the second polyamide is present in an amount from about 20 to about 50 percent by weight, based on the total weight of the first and second polyamides.

27. The method of claim 23 wherein the first polyamide is present in an amount of from about 60 to about 80 percent by weight and the second polyamide is present in an amount from about 20 to about 40 percent by weight, based on the total weight of the first and second polyamides.

28. The method of claim 23 wherein the first polyamide is a nylon 6 homopolymer having an amino terminal group and an acid terminal group.

29. The method of claim 23 wherein the second polyamide is a nylon 6 homopolymer having two terminal amino groups.

30. The method of claim 23 further consisting essentially of blending the first and second polyamides with one or more components selected from the group consisting of oxidative stabilizers, thermal stabilizers, lubricants, mold release agents, flame-retarding agents, oxidation inhibitors, dyes, pigments, coloring agents, ultraviolet light stabilizers, organic fillers, inorganic fillers, reinforcing agents, nucleators and plasticizers.

* * * * *